(12) United States Patent
Keunebrock

(10) Patent No.: US 11,654,391 B2
(45) Date of Patent: May 23, 2023

(54) DEVICE FOR BRINGING A GAS STREAM AND A LIQUID STREAM INTO CONTACT

(71) Applicant: STARKLAB, Nomain (FR)

(72) Inventor: Audrey Keunebrock, Nomain (FR)

(73) Assignee: STARKLAB, Nomain (FR)

( * ) Notice: Subject to any disclaimer, the term of this patent is extended or adjusted under 35 U.S.C. 154(b) by 0 days.

(21) Appl. No.: 17/267,206

(22) PCT Filed: Jul. 22, 2019

(86) PCT No.: PCT/EP2019/069716
§ 371 (c)(1),
(2) Date: Feb. 9, 2021

(87) PCT Pub. No.: WO2020/030419
PCT Pub. Date: Feb. 13, 2020

(65) Prior Publication Data
US 2021/0308614 A1    Oct. 7, 2021

(30) Foreign Application Priority Data

Aug. 10, 2018   (FR) ...................................... 1857446

(51) Int. Cl.
*B01D 47/02*      (2006.01)
*B01F 23/21*      (2022.01)
(Continued)

(52) U.S. Cl.
CPC ............. *B01D 47/12* (2013.01); *B01D 47/02* (2013.01); *B01D 47/022* (2013.01);
(Continued)

(58) Field of Classification Search
CPC ...... B01D 47/02; B01D 47/12; B01D 47/025; B01F 23/214
See application file for complete search history.

(56) References Cited

U.S. PATENT DOCUMENTS 4,162,971 A * 7/1979 Zlokarnik ............... B01F 25/25
                                                              210/220
4,603,035 A * 7/1986 Connell .................. C01B 17/05
                                                              261/DIG. 54
(Continued)

FOREIGN PATENT DOCUMENTS

CA      2619999 A1    2/2007
CN     87105652 A     3/1988
(Continued)

OTHER PUBLICATIONS

Int'l Search Report issued in PCT/EP2019/069716, dated Dec. 9, 2019.
(Continued)

*Primary Examiner* — Robert A Hopkins
(74) *Attorney, Agent, or Firm* — David D. Brush; Westman, Champlin & Koehler, P.A.

(57) ABSTRACT

The device (1) for bringing a gas and a liquid into contact includes an enclosure (E), first means (5) for introducing into the enclosure and circulating therein a gas stream (G), second means (6) for introducing into the enclosure and circulating therein a liquid stream (L) that circulates inside the enclosure (E) in the same direction as the gas stream (G), and means (4A) for mixing the gas stream (G) and the liquid stream (L). These mixing means (4A) are positioned inside the enclosure (E) in the path of the gas stream and liquid stream and are capable of locally deflecting upward, and/or of locally causing to rise, at least one portion of the gas stream and liquid stream, so as to locally create turbulences in the gas stream and in the liquid stream.

26 Claims, 6 Drawing Sheets

(51) Int. Cl.
  *B01D 47/12* (2006.01)
  *B01F 23/23* (2022.01)
  *B01F 23/232* (2022.01)

(52) U.S. Cl.
  CPC .......... *B01D 47/025* (2013.01); *B01F 23/214* (2022.01); *B01D 2247/12* (2013.01); *B01F 23/2368* (2022.01); *B01F 23/232312* (2022.01)

(56) References Cited

U.S. PATENT DOCUMENTS

| | | | |
|---|---|---|---|
| 4,861,165 | A | 8/1989 | Fredriksson et al. |
| 7,293,909 | B2 | 11/2007 | Taniguchi |
| 7,950,630 | B2 | 5/2011 | Curien |
| 8,211,375 | B2 | 7/2012 | Parimi et al. |
| 8,876,363 | B2 | 11/2014 | Brunner et al. |
| 9,586,217 | B2 | 3/2017 | Arminak |
| 9,694,334 | B2 | 7/2017 | Minola |
| 9,808,738 | B2 | 11/2017 | Duesel, Jr. et al. |
| 11,035,614 | B2 | 6/2021 | Zemmouri |
| 2003/0175186 | A1 | 9/2003 | Cohen |

FOREIGN PATENT DOCUMENTS

| | | | | |
|---|---|---|---|---|
| CN | 1496756 | A | 5/2004 | |
| CN | 101495020 | A | 7/2009 | |
| CN | 101970092 | A | 2/2011 | |
| CN | 202527087 | U | 11/2012 | |
| CN | 104754998 | A | 7/2015 | |
| CN | 205965548 | U | 2/2017 | |
| CN | 108295626 | A | 7/2018 | |
| EP | 1749799 | A1 * | 2/2007 | ............ B01F 3/0446 |
| EP | 1749799 | A1 | 2/2007 | |
| GB | 365513 | A | 1/1932 | |
| JP | 42-11321 | | 6/1967 | |
| JP | 59-93632 | | 6/1984 | |
| JP | 2001293330 | A | 10/2001 | |
| JP | 2005144320 | A | 6/2005 | |
| RU | 2530045 | C2 | 10/2014 | |
| RU | 2542248 | C2 | 2/2015 | |
| RU | 2656010 | C2 | 5/2018 | |
| WO | 9841315 | A1 | 9/1998 | |
| WO | 1998041315 | | 9/1998 | |
| WO | 2015086979 | A1 | 6/2015 | |
| WO | 2016071648 | A2 | 5/2016 | |

OTHER PUBLICATIONS

Search Report issued in corresponding Russian Patent Appln. No. 2021101805, dated May 31, 2022.
Search Report issued in corresponding Chinese Patent Appln. No. 201980053011.7, dated Apr. 13, 2022.
English translation of the Written Opinion of the International Searching Authority dated Dec. 9, 2019, for corresponding International Application No. PCT/EP2019/069716.
Japanese Office Action dated Feb. 28, 2023 for corresponding Japanese Application No. 2021-506697.

* cited by examiner

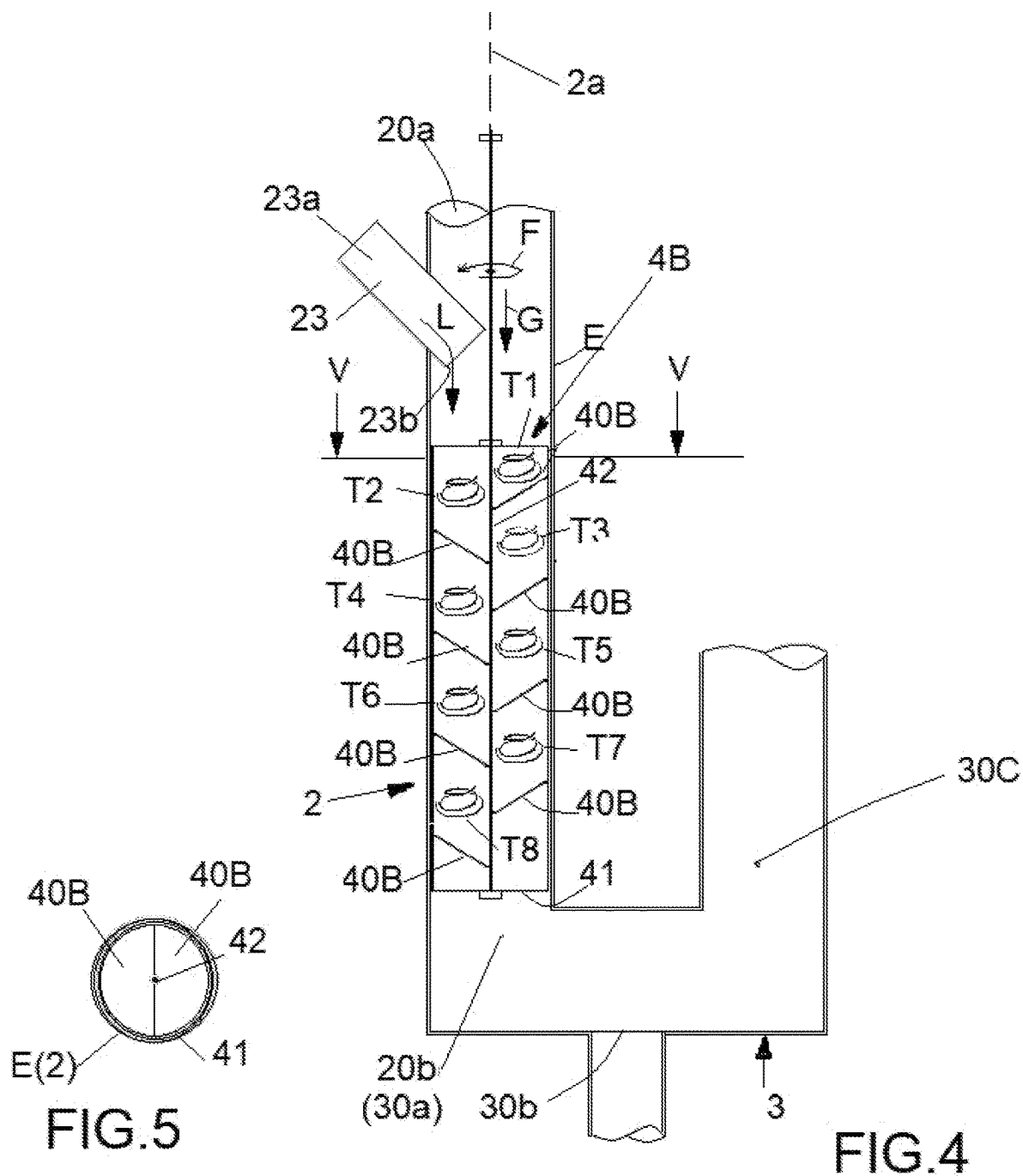

DEVICE FOR BRINGING A GAS STREAM AND A LIQUID STREAM INTO CONTACT

TECHNICAL FIELD

The present invention relates bringing a gas and a liquid into contact in an enclosure, the gas and the liquid circulating in the enclosure in the same direction in the form of a gas stream and a liquid stream, respectively.

PRIOR ART

In the industrial, service or household field, there are a large number of applications in which it proves necessary to bring a gas and a liquid into contact. For example, in a non limiting and non-exhaustive manner, one application consists in bringing a gas into contact with a liquid in order to effect a heat exchange between the gas and the fluid, for example to cool the gas (in particular combustion gases, industrial fumes, etc.) or on the contrary to heat the gas using the liquid, or vice versa to heat the liquid or to cool it using the gas. Another application consists in bringing a gas into contact with a liquid in order to humidify or dehumidify the gas stream. Another application consists in bringing a gas into contact with a liquid in order to clean up or filter the gas stream, in particular by trapping certain pollutants or certain molecules of the gas in the liquid. The aforementioned applications can of course be combined with one another.

Various technical solutions for bringing a gas and a liquid into contact have therefore been proposed to date.

Among these known technical solutions, a first solution may be mentioned, which is described in international patent applications WO2015/086979 and WO2016/071648 by the applicant, and which consists in passing the gas stream directly through a volume of the liquid contained in an enclosure, by injecting the gas stream into the volume of liquid, below the surface of this volume of liquid. This technical solution has the particular advantage of making it possible to achieve high energy yields for the heat exchange between the liquid and the gas by using the thermal conductivity and the latent heat of the liquid. However, it has the drawback of requiring the use of high-power fans or compressors to inject the gas stream into the volume of liquid because of the significant pressure drop caused by this volume of liquid on the path of the gaseous flow.

A second technical solution consists in passing the gas stream through a curtain of fine droplets of the liquid or through an exchange surface permeable to the gas and containing the liquid, for example a textile material imbibed with water. The main drawback of this type of solution lies in the very low energy yield of the heat exchange between the liquid and the gas stream, which detrimentally requires the use of very large and bulky exchange surfaces. The same is true for gas filtering applications, which require the use of very large and bulky contact surfaces between the gas and the liquid.

A third known technical solution consists in circulating in a vertical exchange enclosure of the tower type, in opposite directions and in contact with one another, an ascending gas stream and a liquid stream descending by gravity in the enclosure. This third technical solution has the advantage of requiring the implementation, for the forced circulation of the ascending gas stream, of fans or compressors which are generally of lower power than for the first aforementioned solution, because the pressure drop on the path of the gas stream is low. On the other hand, like for the aforementioned second solution, the energy efficiency of the heat exchange between the liquid and the gas is lower than for the first solution, which in practice requires the use of exchange enclosures of very large height in order to sufficiently increase the contact duration between the gas and the liquid. The same is true with this third solution for gas filtering applications using liquid.

PURPOSE OF THE INVENTION

The present invention aims to provide a new technical solution for bringing a gas and a liquid into contact.

More particularly, this new technical solution makes it possible to improve the efficiency of the contact between the gas and the liquid compared to the second and third solutions mentioned above.

More particularly, this new technical solution makes it possible to obtain a pressure drop on the path of the gas stream which may be less than the first technical solution mentioned above.

SUMMARY OF THE INVENTION

The invention thus relates to a device for bringing a gas and a liquid into contact comprising an enclosure, first means for introducing into said enclosure and circulating therein a gas stream, second means for introducing into said enclosure and circulating therein a liquid stream that circulates inside the enclosure in the same direction as the gas stream, and means for mixing the gas stream and the liquid stream, which are positioned inside the enclosure in the path of the gas stream and liquid stream and which are capable of locally deflecting upward, and/or of locally causing to rise, at least one portion of the gas stream and liquid stream, so as to locally create turbulences in the gas stream and in the liquid stream.

In the context of the invention, the directions of circulation of the gas stream and of the liquid stream being the same, the invention can advantageously be easily implemented with extremely varied working pressures, and unlike the aforementioned solutions of the prior art, can advantageously be implemented easily in particular with high working pressures above atmospheric pressure.

More specifically, the device constituting the invention may comprise the following additional and optional features, taken in isolation, or in combination with each other:

- the enclosure comprises at least a first portion in which the gas stream and the liquid stream descend.
- the mixing means are positioned inside said first portion of the enclosure and comprise at least one mixing element, and more particularly at least one static mixing element, which mixing element has a concave curved upper surface, the curvature of which makes it possible to locally deflect upward at least one portion of the descending gas stream and of the descending liquid stream, so as to locally create turbulence in the descending gas stream and in the descending liquid stream.
- the mixing means comprise a plurality of mixing elements which are spaced apart in the vertical direction, and preferably which are also spaced apart in the horizontal direction.
- each mixing element is fixed inside said first portion of the enclosure at or in the vicinity of one of its edges and comprises, opposite this fixing edge, a free edge which is located at a level lower than the fixing edge of the mixing element, but at a level higher than the lowest point of the curved upper face of the mixing element.

said first portion of the enclosure comprises a central axis and the free edge of each mixing element is positioned substantially at or near this central axis.

the mixing means comprise, inside the enclosure, at least one rotary mixing member, which makes it possible when it is rotated to locally raise and/or locally deflect upward at least one portion of the gas stream and the liquid stream, so as to locally create turbulences in the gas stream and in the liquid stream.

said rotary mixing member comprises a rotary drum inside which the gas stream and the liquid stream can circulate and which is equipped with internal blades.

said rotary drum is oriented substantially vertically or is inclined downward in the direction of circulation of the gas stream and the liquid stream.

the internal blades are vertically and horizontally spaced apart and each internal blade extends from the wall of the drum preferably to substantially the central axis of the rotary drum.

each internal blade is tilted downward.

the internal blades are spaced apart vertically and each internal blade comprises a plate in which an opening is formed which allows the passage of the gas stream and the liquid stream through the wall, each opening preferably being offset in the horizontal direction with respect to the opening of the underlying plate, so as to create a more tortuous path through the plates for the gas stream and liquid stream.

said rotary drum is oriented substantially horizontally and the internal blades are radial.

the admission of the liquid stream into the enclosure comprises an intake conduit which comprises, on the outside of the enclosure, an opening for admission of said liquid stream and, inside the enclosure, an opening for the introduction into the enclosure of the liquid stream.

the mixing means are substantially centered on an axis and said opening for introducing the liquid stream into the enclosure is positioned substantially at or close to this axis.

the intake conduit is inclined relative to the central axis by an angle substantially equal to 45°.

the opening of the intake conduit for introducing the descending liquid stream into the enclosure is positioned facing the highest mixing element.

the highest mixing element having a concave curved upper surface, the curvature of which makes it possible to locally deflect at least one portion of the descending gas stream and the descending liquid stream upward, so as to locally create turbulences in the descending gas stream and in the descending liquid stream, the opening of the intake conduit for introducing the descending liquid stream into the enclosure is positioned with regard to this curved upper face of the highest mixing element such that the liquid stream at the outlet of the intake conduit is directed toward this curved upper face.

the first means for introducing and circulating the gas stream in said enclosure comprise a fan or compressor which is connected to the enclosure and which makes it possible to introduce and forcefully circulate a gas stream to the inside the enclosure, preferably with an adjustable flow rate.

the second means for introducing and circulating the liquid stream in said enclosure comprise a pump which is connected to the enclosure and which makes it possible to introduce a liquid stream inside the enclosure, preferably with an adjustable flow rate.

the enclosure comprises, downstream from the mixing means, a horizontal portion inside which is fixed at least one lower vertical internal wall which comprises a free upper edge spaced apart from a wall of this horizontal portion of the enclosure, so as to provide, between this wall and said free upper edge, a passage for the gas and the liquid.

the device comprises, inside the horizontal portion of the enclosure, at least one upper internal wall, which comprises a free lower edge spaced apart from a wall of the horizontal portion of the enclosure, so as to provide a passage between this wall and said free lower edge and to force the gas to mix with the liquid as it passes through the horizontal portion of the enclosure.

the free lower edge of the upper internal wall is positioned substantially at the same level or at a lower level than the free upper edge of the lower vertical internal wall.

Another object of the invention is a method for bringing a gas into contact with a liquid by means of the aforementioned device, in which a stream of said gas and a stream of said liquid are introduced, preferably continuously, into the vertical enclosure upstream from the mixing means.

Another object of the invention is the use of the aforementioned device for bringing a gas and a liquid into contact.

BRIEF DESCRIPTION OF THE FIGURES

The features and advantages of the invention will become apparent from reading the detailed description below of several particular embodiments of the invention, which particular embodiments are described as non-limiting and non-exhaustive examples of the invention, and with reference to the accompanying drawings in which:

FIG. 4 is a cross-sectional view in a vertical plane of a second variant embodiment of a device of the invention.

FIG. 5 is a cross-sectional view of said second variant embodiment in the horizontal section plane V-V of FIG. 4;

DETAILED DESCRIPTION

Figure 1:
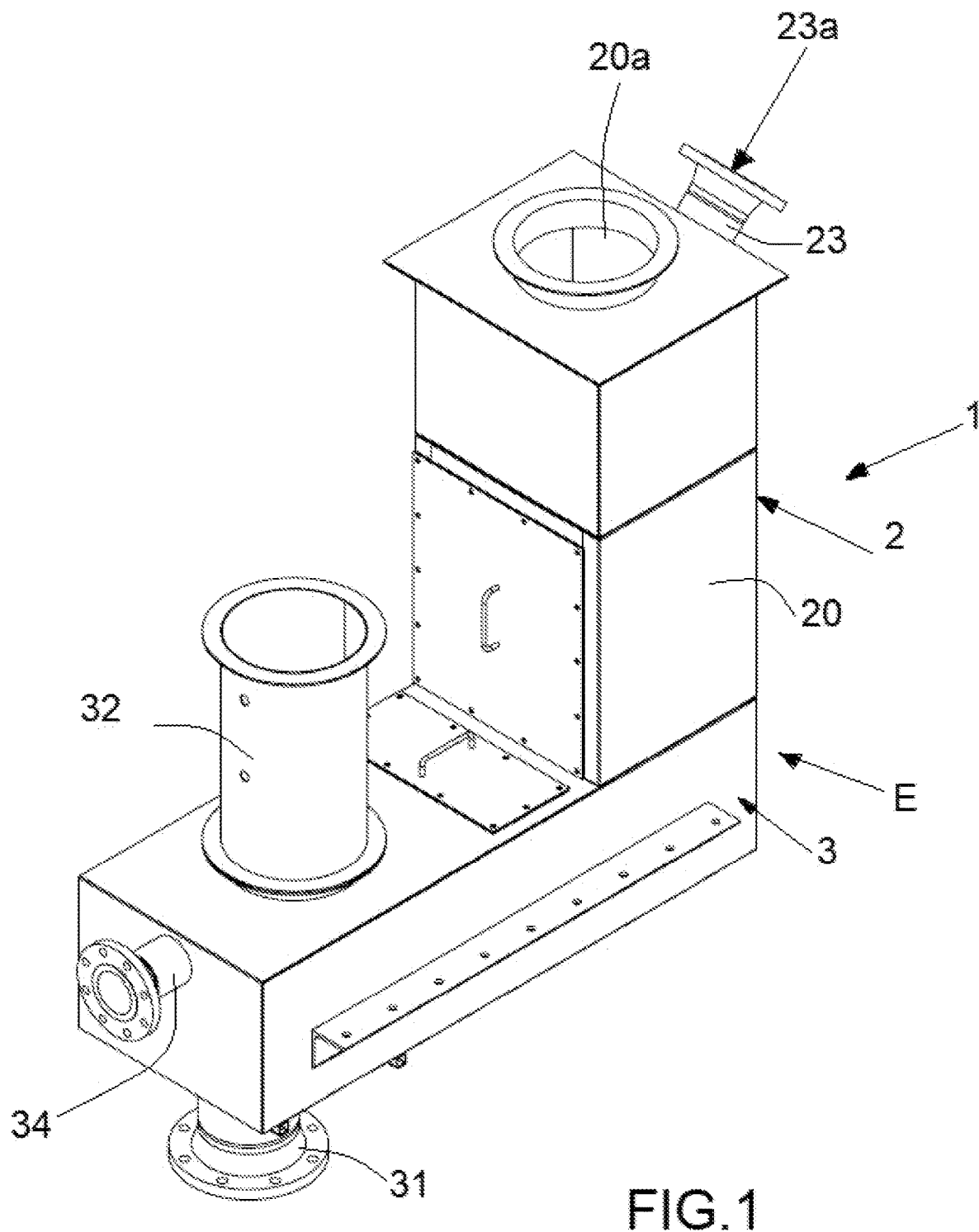
FIG. 1 is an isometric perspective view of a first variant embodiment of a device of the invention.
Figure 2:
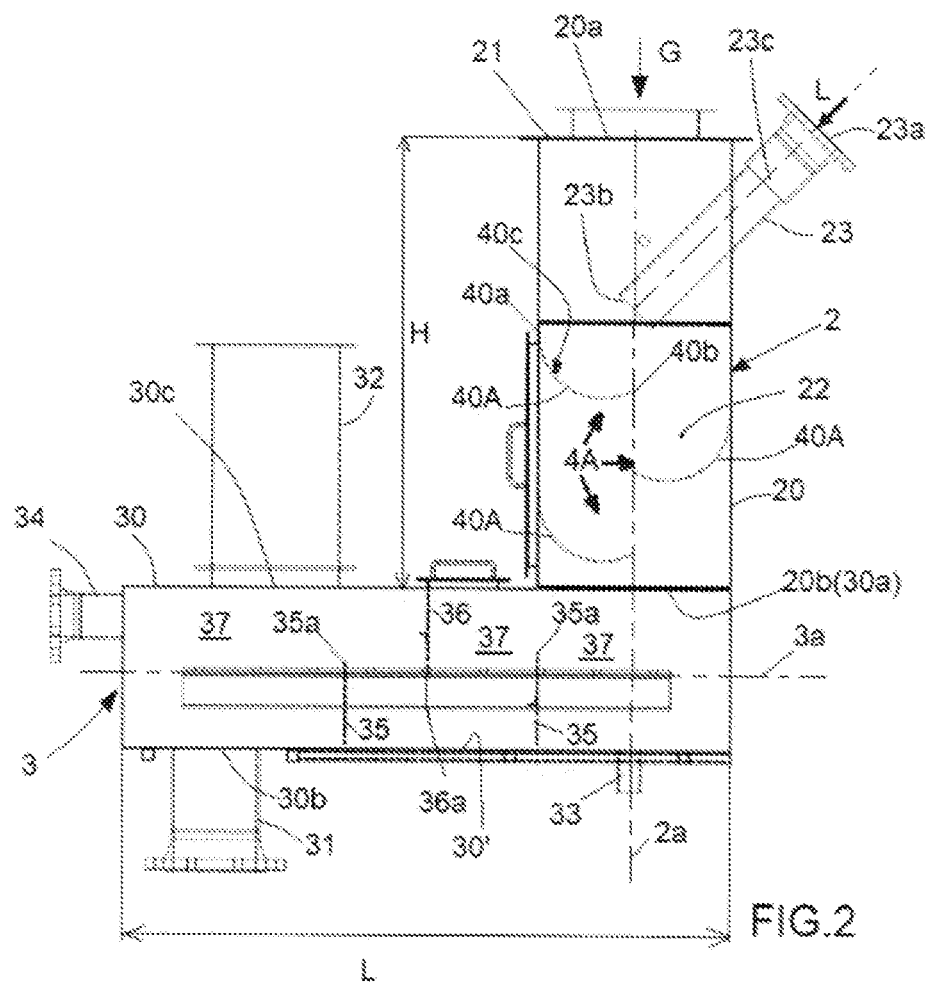
FIG. 2 is a side view of the device of FIG. 1.
Figure 3:
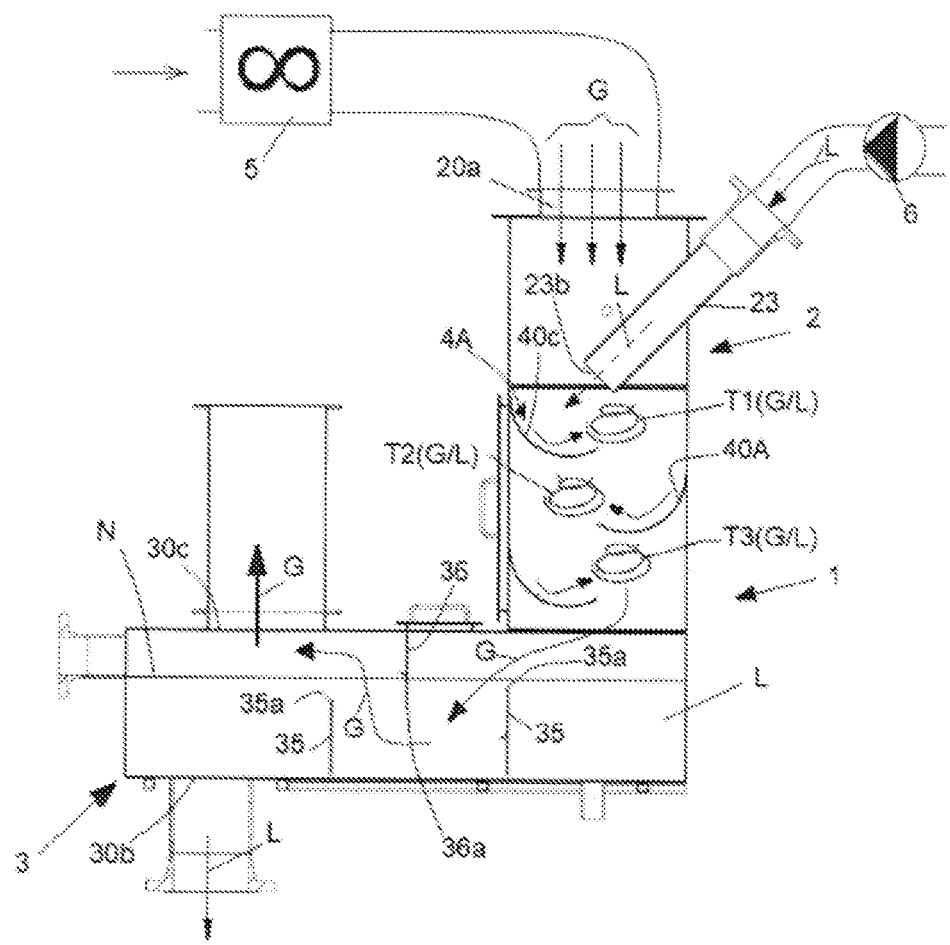
FIG. 3 is a cross-sectional view in a central vertical plane of the device of FIG. 1, the vertical enclosure of which is connected to a fan (or compressor) and to a pump, and which is in operation.

FIGS. 1 to 3 show a variant embodiment of a device 1 of the invention for bringing a gas stream G and a liquid stream L flowing in the same direction into contact.

This device 1 comprises an enclosure E, which in this particular example and in a non-limiting manner with respect to the invention, comprises a first vertical portion 2 of central vertical axis 2a and of height H, which communicates in the bottom with a second horizontal portion 3 of length L.

Referring to FIG. 2, this first portion 2 of the enclosure E comprises a side wall 20, which defines a vertical internal passage 22 for the flow of the descending gas stream G and the descending liquid stream L, and an upper wall 21 in which an opening 20a is formed for admission into the enclosure 2 of a descending gas stream G, which is preferably oriented substantially vertically at the inlet of the enclosure 2.

The enclosure 2 comprises, in the bottom, a lower opening 20b which allows it to communicate with the horizontal enclosure 3.

In the variant of FIGS. 1 to 3, this first vertical portion 2 of the enclosure E forms a tower having a quadrangular cross-section in a horizontal plane, and in this case a square cross-section, it being specified that the geometry of this cross-section of this first vertical portion 2 is of no importance for the invention. In another variant, this first vertical portion 2 can, for example, have a circular cross-section in a horizontal plane.

The first vertical portion 2 of the enclosure E is equipped with an intake conduit 23, with central axis 23c which passes through the side wall 20 of the enclosure 2.

This intake conduit 23 comprises, outside the enclosure E, an intake opening 23a for a descending liquid stream L and inside the first vertical portion 2 of the enclosure E, an opening 23b for the introduction into the enclosure 2 of the descending liquid stream L.

Preferably, but in a non-limiting manner with respect to the invention, the axis 23c of the conduit is inclined with respect to the vertical by an angle substantially equal to 45°; the opening 23b for introducing the descending liquid stream L into the enclosure 2 is positioned substantially at or near the central vertical axis 2a of the first vertical portion 2 of the enclosure E.

The enclosure E is also equipped with static mixing means 4A, which are positioned inside the first vertical portion 2 of the enclosure E, on the path of the descending gas stream G and of the descending liquid stream L, downstream of the gas inlet opening 20a and of the liquid inlet opening 23b.

In this particular embodiment, these mixing means 4A comprise mixing elements 40A, in the form of curved plates, which are fixed to the side wall 20 of the first vertical portion 2 of the enclosure E. Each plate 40A has a curvature, in this case and in a non limiting manner with respect to the invention in the form of an arc of a circle, which makes it possible to locally deflect upward at least one portion of the descending gas stream and of the descending liquid stream, so as to locally create turbulences T1, T2, T3 (FIG. 3) in the descending gas stream and in the descending liquid stream, while allowing the descending gas stream and the descending liquid stream to pass downward.

More particularly, each curved plate 40A comprises a concave upper face 40c. Each curved plate 40A is fixed at or in the vicinity of one 40a of its edges to the side wall 20 of the first vertical portion 2 of the enclosure E, and has a free edge 40b, opposite the wall 20, which is located at a level lower than the fixing edge 40a of the plate 40A, but at a level slightly higher than the lowest point of the curved upper face 40c of the plate 40A.

This free edge 40b is spaced from the side wall of the first vertical portion 2 of the enclosure E, which makes it possible to provide a space, between this free edge and said side wall, allowing the downward passage of the descending gas stream and of the descending liquid stream.

Preferably, but in a non limiting manner with respect to the invention, the free edge 40b of each plate 40A is positioned substantially at or near the central vertical axis 2a of the first vertical portion 2 of the enclosure E.

The curved plates 40A are fixed inside the first vertical portion 2 of the enclosure E, while being spaced apart from each other in the vertical direction and preferably being spaced apart from each other in the horizontal direction, more preferably and as illustrated in FIGS. 2 and 3 while being in opposition to each other.

In the particular embodiment of FIG. 2, the device comprises three successive plates 40A, it being specified that in the context of the invention the device may comprise a greater or lesser number of plates 40A.

With reference to FIG. 2, the opening 23b of the intake conduit 23 is positioned opposite the upper face 40c of the uppermost first plate 40A, such that the liquid stream L at the outlet of the intake conduit 23 is directed toward the upper face 40c of this uppermost first plate 40.

In a less efficient alternative embodiment, the device could only comprise this uppermost first plate 40A.

The second horizontal portion 3 of the enclosure E, with horizontal central axis 3a, comprises an upper wall 30 in which an opening 30a is formed which coincides with the lower opening 20b of the first vertical portion 2 of the enclosure E, and which allows the two parts 2 and 3 to communicate with each other.

In its extreme part furthest from the first vertical portion 2 of the enclosure E, the second horizontal portion 3 of the enclosure E comprises a lower discharge opening 30b for the discharge at least by gravity of the liquid at the outlet of the enclosure E and an upper discharge opening 30c for the discharge of gas at the outlet of the enclosure E. The liquid discharge opening 30b communicates with a lower vertical discharge conduit 31 and the gas discharge opening 30c communicates with an upper vertical discharge conduit 32.

The second horizontal portion 3 of the enclosure E further comprises a manual emptying opening 33, which, during the operation of the device 1, is temporarily closed by means of a removable plug, and which can be opened to perform manual emptying by gravity of the liquid remaining in the device 1 at the end of operation.

The second horizontal portion 3 of the enclosure E also comprises, at the top, a discharge conduit 34 which makes it possible to control the level of liquid in the horizontal enclosure 3, and if necessary to discharge a surplus of liquid when the liquid level reached in the second horizontal portion 3 of the enclosure E is too high.

Inside the second horizontal portion 3 of the enclosure E, the device comprises two lower vertical internal walls 35, which are spaced apart in the horizontal direction, and which define three successive internal chambers 37 along the second horizontal portion 3 of the enclosure E. The free upper edge 35a of each lower vertical internal wall 35 is spaced apart from the upper wall 30 of the second horizontal portion 3 of the enclosure E, so as to provide, between this upper wall 30 and said free upper edge 35a, a passage making it possible to make two neighboring enclosures communicate with each other 37.

In order to force the gas to mix with the liquid as it passes through the horizontal enclosure 3 and to prevent premature separation of the gas and the liquid in the upstream part of the second horizontal portion 3 of the enclosure E in the region of the first vertical portion 2 of the enclosure E, the device also comprises an upper internal wall 36, which is positioned between the two lower vertical internal walls 35. The free lower edge 36a of this upper vertical internal wall 36 is spaced apart from the lower wall 30' of the second horizontal portion 3 of the enclosure E, so as to provide a passage between this lower wall 30' and said lower edge 36a.

The free lower edge 36a of this upper vertical internal wall 36 is preferably located below the level of the free upper edges 35a of the lower vertical internal walls 35.

Referring to FIG. 3, in operation, the intake opening 20a of the enclosure E is connected to a compressor or fan 5 (FIG. 3) which makes it possible to introduce a gas stream G, upstream from the mixing means 4A, continuously and preferably with an adjustable flow rate, and which allows said gas stream to circulate inside the enclosure E between the gas intake opening 20a and the gas discharge opening 30c, G.

The intake conduit 23 is connected to a pump 6, which makes it possible to introduce a descending liquid stream L continuously, upstream from the mixing means 4A, inside the enclosure E, preferably with an adjustable flow rate. This pump 6 makes it possible to circulate said liquid stream L in the same circulation direction as the gas stream G, between the liquid intake opening 3b and the liquid discharge opening 30b.

Initially, the second horizontal portion 3 of the enclosure E is pre-filled with a liquid level N (FIG. 3), which is preferably located above the upper edge 35a of the lower vertical internal walls 35, which lower vertical internal walls 35 are thus completely submerged in the liquid contained in the second horizontal portion 3 of the enclosure E. The upper vertical internal wall 36 is partly submerged in the liquid contained in the second horizontal portion 3 of the enclosure E, the lower edge 36a of this upper vertical internal wall 36 being submerged below the liquid level N.

During operation, the fan or compressor 5 and the pump 6 being on, at the outlet 23b of the intake conduit 23, a descending liquid stream L is projected against the curved upper face 40c of the uppermost first plate 40A and is at least partially deflected upward. At least one portion of the descending gas stream G in contact with this uppermost first plate 40A is also locally deflected upward. This results in the formation locally at this uppermost first plate 40A of a turbulence T1 which advantageously allows mixing and a more intimate blend of gas and liquid.

The liquid stream flowing downward by gravity in the first vertical portion 2 of the enclosure E and the gas stream being forced to descend inside the first vertical portion 2 of the enclosure E by the fan or compressor 5, the gas stream and the liquid stream descend into the enclosure to the next curved plate 40A, and the same phenomena of upward deflection of gas and liquid with formation of turbulence T2, T3 occur at the other curved plates 40A.

At the outlet of the first vertical portion 2 of the enclosure E, a first intimate blend of the gas stream G and the liquid stream L is thus obtained. The presence on the path of the gas and liquid streams of the curved plates 40A creating the turbulences T1, T2, T3 advantageously makes it possible to improve the efficiency of this blending and thus to reduce the height H of the first vertical portion 2 of the enclosure E. In addition, the pressure drop created on the path of the gas stream G by the curved plates 40A is low, which makes it possible to avoid oversizing the fan or compressor 5.

After they pass through the first vertical portion of the enclosure E, the liquid stream and the gas stream descend into the second horizontal portion 3 of the enclosure E, passing through the openings 20b, 30a.

During operation, the liquid flows in the horizontal enclosure 3 as far as the liquid discharge opening 30b, which continuously renews the liquid contained in the enclosure; the upper vertical internal wall 36 obstructs the passage of gas and forces the gas stream to pass through the volume of liquid contained in the second horizontal portion 3 of the enclosure E, which makes it possible to obtain additional contact between the gas and the liquid.

The separation of the gas and the liquid takes place in the downstream end portion of the second horizontal portion 3 of the enclosure E, opposite the first vertical portion 2 of the enclosure E, the gas stream after contact with liquid being discharged from the enclosure E through the upper discharge opening 30c and the liquid being discharged from the enclosure E through the lower discharge opening 30b.

In another variant embodiment of the invention, the device could only comprise a vertical portion 2 and could be devoid of a horizontal portion 3, the gas discharge opening and the liquid discharge opening in this case for example being provided in said vertical portion 2.

The plates 40A can be replaced by any equivalent mixing means fulfilling the function of locally deflecting upward and/or of locally raising at least one portion of the descending gas stream and the descending liquid stream, so as to locally create turbulence in the descending gas stream and in the descending liquid stream, while allowing the downward passage of the descending gas stream and the descending liquid stream.

For example and in a non-exhaustive manner, the mixing means may comprise paddle wheels which are positioned inside the enclosure, on the path of the descending gas stream and of the descending liquid stream, and which are suitable, when they are rotated, for causing at least one portion of the descending gas stream and the descending liquid stream to rise locally, so as to locally create turbulences in the descending gas stream and in the descending liquid stream. These paddle wheels or the like can also be combined with curved plates 40A.

Variation of FIGS. 4 and 5

In the variant embodiment of FIGS. 4 and 5, the mixing means 4B are rotary means. They comprise a rotary drum 40, inside which the gas stream G and the liquid stream L can circulate, and which is equipped with internal blades 40B inclined downward. This drum 40 is mounted coaxially inside the vertical portion 2 of the enclosure E, while being fixed to a central vertical shaft 42. The mixing means 4B also comprise motorization means which make it possible to set the shaft 42 in rotation on itself, and thus to set the drum 41 in rotation about a vertical central axis which is coincident with the vertical central axis 2a of the vertical portion 2 of the enclosure E.

Preferably as illustrated, each internal blade 40B is a flat semi-cylindrical wall, which extends from the cylindrical internal wall 41 of the drumup to substantially the central rotating shaft 42 and which more particularly is inclined downward.

More particularly, the internal blades 40B are vertically and horizontally spaced apart.

During operation, the rotary drum 41 equipped with the internal blades 40B is driven in rotation (FIG. 4, arrow F) by the motorization means of the mixing means 4B at a controlled speed and the liquid stream and the descending gas stream are introduced into the enclosure E upstream from the mixing means 4B owing to the implementation of a fan or compressor (not shown in FIGS. 4 and 5) and a pump (not shown in FIGS. 4 and 5) identically to the variant of FIGS. 1 to 3 previously described.

The descending liquid stream L and the descending gas stream G flow in the same direction downward in successive contact with the rotating internal blades 40B. Under the effect of their rotation, each rotating internal blade 40B causes at least one portion of the gas stream and the liquid stream to rise locally, so as to locally create successive turbulences T1 to T8 in the gas stream and in the liquid stream.

An intimate blend of the gas stream G and the liquid stream L is thus obtained at the outlet of the vertical portion 2 of the enclosure E. The presence on the path of the gas and liquid streams of the rotating internal blades 40B creating the turbulences T1 to T8 advantageously makes it possible to improve the efficiency of this blending and thus to reduce the height of the first vertical portion 2 of the enclosure E. In addition, the pressure drop created on the path of the gas stream G by the rotating internal blades 40B is low, which makes it possible to avoid oversizing the fan or compressor.

After their passage through the first vertical portion of the enclosure E, the liquid stream L and the gas stream G descend into the second horizontal portion 3 of the enclosure E and are discharged respectively through the discharge openings 30b and 30c.

Figures 6, 7:
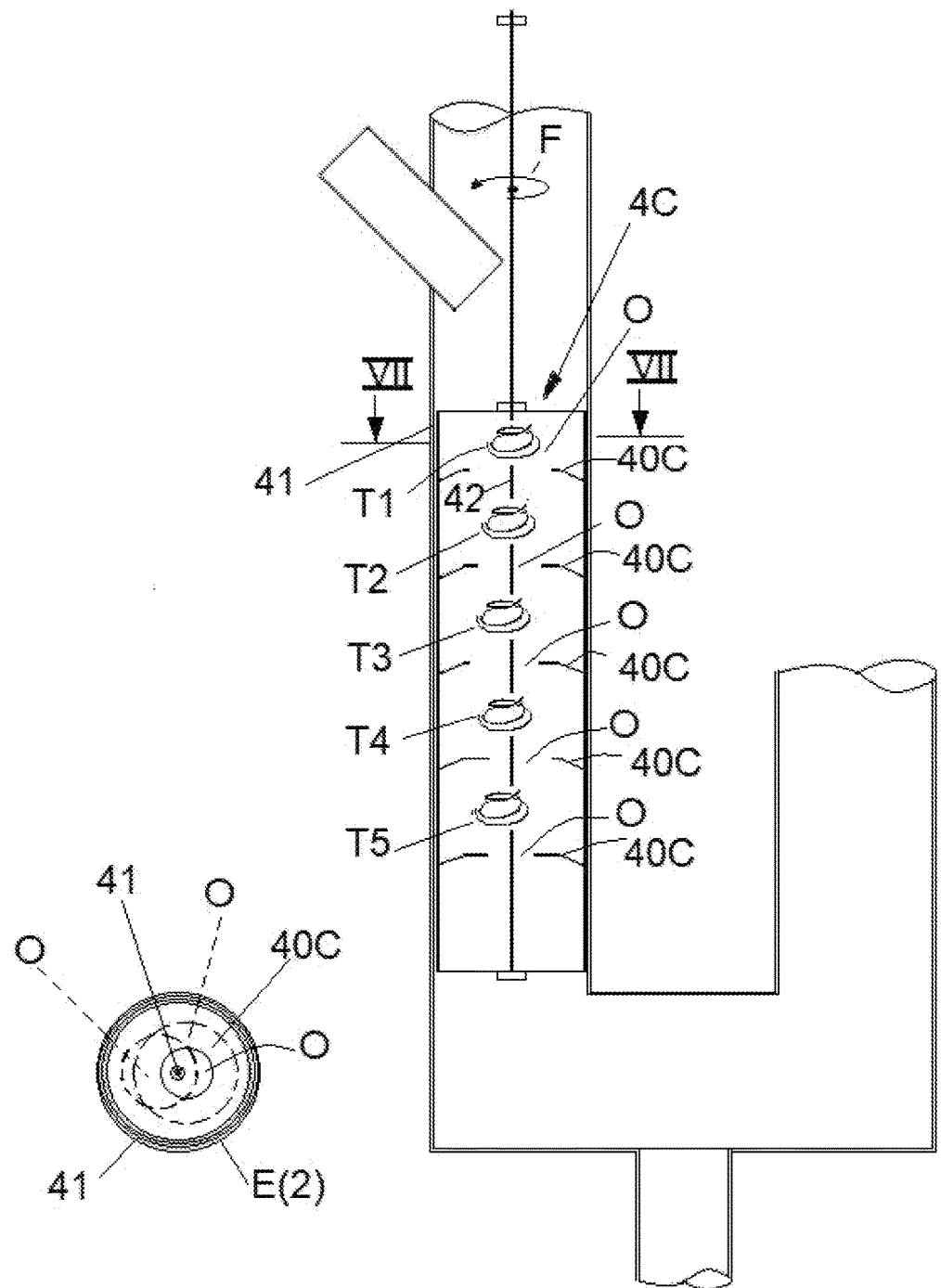
FIG. 6 is a cross-sectional view in a vertical plane of a third variant embodiment of a device of the invention.
FIG. 7 is a cross-sectional view of said third variant embodiment in the horizontal section plane VII-VII of FIG. 6.

Variation of FIGS. 6 and 7

The variant of FIGS. 6 and 7 differs from the variant of FIGS. 4 and 5 in that the inclined internal blades 40B have been replaced by circular plates 40C. In each circular plate 40C, an opening O is formed for the passage of the liquid stream L and the gas stream G through the plate 40C. The plate 40C are vertically spaced apart and the rotating shaft 42 of the drum 41 is passed through the openings O of these plates. Preferably, as illustrated, the openings O are not aligned in the direction of the central axis of rotation of the drum 41 (that is to say the vertical direction in the case of FIGS. 6 and 7), but each opening O is offset in the horizontal direction with respect to the opening of the underlying plate 40C, so as to create a more tortuous path through the plates 40C for the gas stream and the liquid stream.

During operation, and in a manner comparable to the variant of FIGS. 4 and 5, the rotary drum 41 equipped with the plates 40C is driven in rotation (FIG. 6, arrow F) by the motorization means of the mixing means 4C at a controlled speed and the liquid stream and the descending gas stream are introduced into the enclosure E upstream from the mixing means 4C owing to the use of a fan or compressor (not shown in FIGS. 6 and 7) and a pump (not shown in FIGS. 6 and 7)

The descending liquid stream L and the descending gas stream G flow in the same direction downward in successive contact with the rotating internal plates 40C. Under the effect of their rotation, each rotating internal plate 40C causes at least one portion of the gas stream and the liquid stream to rise locally, so as to locally create successive turbulences T1 to T5 in the gas stream and in the liquid stream. An intimate blend of the gas stream G and the liquid stream L is thus obtained at the outlet of the vertical portion 2 of the enclosure E The previously described variants of FIGS. 1 to 6 can also be modified so that the first portion 2 of the enclosure E, and where appropriate the rotary drum 41 equipped with internal blades or plate, are not oriented strictly vertically but can be inclined downward in the direction of flow of the gas stream and the liquid stream.

The second variant of FIGS. 4 and 5 and the third variant of FIGS. 6 and 7 can also be modified so that the horizontal portion 3 of the enclosure E of these variants are equipped with the same plates 35 and 36 as the first variant of FIGS. 1 to 3.

Figures 8, 9:
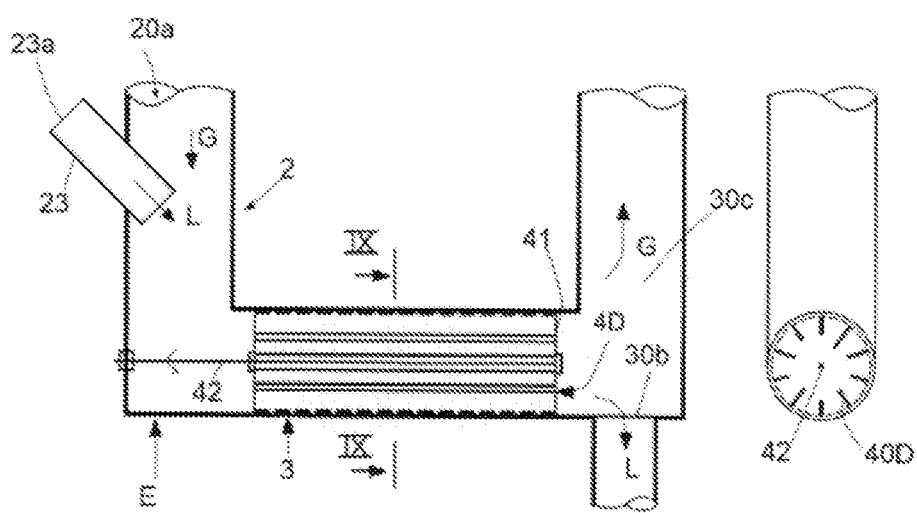
FIG. 8 is a cross-sectional view in a vertical plane of a second variant embodiment of a device of the invention.
FIG. 9 is a cross-sectional view of said second variant embodiment in the horizontal section plane IX-IX of FIG. 8.

Variant of FIGS. 8 and 9

In the variant of FIGS. 8 and 9, the mixing means 4D comprise a rotary drum 41 which, unlike the variants of FIGS. 4 to 7, is positioned in the horizontal portion 3 of the enclosure E and is oriented substantially horizontally. This drum 41 is equipped with internal blades 40D which are fixed to the internal wall of the drum, which are oriented radially in the direction of their width, and which extend in the direction of their length parallel to the central axis of rotation of the drum.

During operation, the rotary drum 41 equipped with the radial internal blades 40D is driven in rotation by motorization means at a controlled speed and the liquid stream and the gas stream are introduced into the enclosure E upstream from the mixing means 4D owing to the implementation of a fan or compressor (not shown in FIGS. 8 and 9) and a pump (not shown in FIGS. 8 and 9)

The liquid stream L and the gas stream G circulate in the same direction substantially horizontally passing through the rotary drum 41. Under the effect of their rotation, the internal blades 40D locally cause at least one portion of the gas stream and the liquid stream to rise inside the drum, so as to locally create successive turbulences in the gas stream and in the liquid stream. An intimate blend of the gas stream G and the liquid stream L is thus obtained at the outlet of the horizontal portion 3 of the enclosure E.

In the context of the invention, the rotary drum can be replaced by any rotating mixing means positioned inside the enclosure E in the path of the gas stream G and the liquid stream L and which is capable of locally deflecting upward, and/or of locally causing to rise, at least one portion of the gas stream and the liquid stream, so as to locally create turbulences in the gas stream and in the liquid stream. The rotary drum can for example be replaced by a rotating screw fulfilling the same mixing function Applications The device of the invention can be used in all technical fields where it is useful to bring a gas stream G into contact with a liquid stream.

The liquid can be of any type and can, for example, but not necessarily, be water or an acidic, a neutral or a basic solution.

By way of non-limiting and non-exhaustive examples of application, The device of the invention can for example be used in the following applications, which applications can be combined if necessary:

bringing a gas into contact with a liquid in order to achieve a heat exchange between the gas and the fluid, for example to cool the gas (in particular combustion gases, industrial fumes, etc.) or on the contrary to heat the gas by means of the liquid or vice versa to heat the liquid or cool it by means of the gas.

bringing a gas into contact with a liquid in order to humidify or dehumidify the gas stream.

bringing a gas into contact with a liquid in order to clean up or filter the gas stream, in particular by trapping certain pollutants or certain molecules of the gas in the liquid, such as for example dust, pollutants of the NOx type (nitrogen oxides), $SO_2$, $CO_2$, chlorine or chlorinated derivatives, etc.

condensing vapors or mist using a liquid cooler than the gas.

The invention claimed is:

1. A device for bringing a gas and a liquid into contact comprising an enclosure, first means (5) for introducing into said enclosure and circulating therein a gas stream, second means (6) for introducing into said enclosure and circulating therein a liquid stream that circulates inside the enclosure in the same direction as the gas stream, and the enclosure comprising at least a first portion in which the gas stream and the liquid stream descend, the device further comprising mixing means for mixing the gas stream and the liquid stream, said mixing means comprising at least one mixing element, said at least one mixing element being positioned inside the first portion of the enclosure in a path of the gas stream and liquid stream, wherein said at least one mixing element has a concave curved upper surface whose curvature is adapted to locally deflect at least one portion of the descending gas stream and of the descending liquid stream upward, so as to locally create turbulence in the descending gas stream and in the descending liquid stream, wherein said at least one mixing element has a first edge and a opposite second edge and is fixed inside said first portion of the enclosure, wherein the second opposite edge is spaced from a side wall of the first portion of the enclosure to provide a space between said second edge and said side wall and to allow a downward passage of the descending gas stream and of the descending liquid stream and wherein the second edge is located at a level lower than the first edge but at a level higher than a lowest point of the curved upper surface of the at least one mixing element.

2. The device according to claim 1, wherein said first portion of the enclosure comprises a central axis and the second edge of said at least one mixing element is positioned substantially at or near this central axis.

3. The device according to claim 1, wherein the admission of the liquid stream into the enclosure comprises an intake conduit which comprises a first opening on an outside of the enclosure for admission of said liquid stream and a second opening inside the enclosure for the introduction of the liquid stream (L) into the enclosure.

4. The device according to claim 3, wherein the opening of the intake conduit is positioned facing the at least one mixing element.

5. The device according to claim 1, wherein the first means for introducing and circulating the gas stream in said enclosure comprise a fan or compressor which is connected to the enclosure and is adapted to introduce and forcefully circulate a gas stream to the inside the enclosure.

6. The device according to claim 1, wherein the second means for introducing and circulating the liquid stream in said enclosure comprise a pump which is connected to the enclosure and which is adapted to introduce a liquid stream inside the enclosure.

7. The device according to claim 1, wherein the enclosure comprises, downstream from the mixing means, a horizontal portion inside which is fixed at least one lower vertical internal wall which comprises a free upper edge spaced apart from a wall of this horizontal portion of the enclosure, so as to provide, between this wall and said free upper edge, a passage for the gas and the liquid.

8. The device according to claim 7, comprising, inside the horizontal portion of the enclosure, at least one upper internal wall, which comprises a free lower edge spaced apart from a wall of the horizontal portion of the enclosure, so as to provide a passage between this wall and said free lower edge and to force the gas to mix with the liquid as it passes through the horizontal portion of the enclosure.

9. The device according to claim 1, wherein the at least one mixing element comprises a plurality of mixing elements which are spaced apart in the vertical direction.

10. The device of claim 7, wherein the free lower edge of the at least one upper internal wall is positioned substantially at the same level as or at a lower level than the free upper edge of the lower vertical internal wall.

11. The device of claim 3, wherein the at least one mixing element is substantially centered on a vertical central axis and said second opening is positioned substantially at or close to the vertical central axis.

12. The device of claim 11, wherein the intake conduit is inclined relative to the vertical central axis by an angle substantially equal to 45°.

13. A method for bringing a gas into contact with a liquid by means of the device according to claim 1, in which a stream of said gas and a stream of said liquid are introduced into the enclosure upstream from the at least one mixing element.

14. The device of claim 9, wherein the plurality of mixing elements are also spaced apart in the horizontal direction.

15. A device for bringing a gas and a liquid into contact comprising an enclosure, first means for introducing into said enclosure and circulating therein a gas stream, second means for introducing into said enclosure and circulating therein a liquid stream that circulates inside the enclosure in the same direction as the gas stream, and means for mixing the gas stream and the liquid stream, the means for mixing the gas stream and the liquid stream are positioned inside the enclosure in a path of the gas stream and liquid stream and the means for mixing the gas stream and the liquid stream comprise at least one rotary mixing member, which is adapted when it is rotated to locally deflect upward, at least one portion of the gas stream and the liquid stream, so as to locally create turbulences in the gas stream and in the liquid stream.

16. The device according to claim 15, wherein said rotary mixing member comprises a rotary drum inside which the gas stream and the liquid stream can circulate and which is equipped with internal blades.

17. The device according to claim 16, wherein said rotary drum is oriented substantially vertically or is inclined downward in the direction of circulation of the gas stream and the liquid stream.

18. The device according to claim 16, wherein the internal blades are vertically and horizontally spaced apart and each internal blade extends from the wall of the drum.

19. The device according to claim 16, wherein each internal blade is inclined downward.

20. The device according to claim 16 wherein the internal blades are spaced apart vertically and each internal blade comprises a plate in which an opening is formed which allows a passage of the gas stream and the liquid stream through the wall, each opening being offset in the horizontal direction with respect to the opening of the underlying plate, so as to create a more tortuous path through the plates for the gas stream and liquid stream.

21. The device according to claim 16, wherein said rotary drum (41) is oriented substantially horizontally and the internal blades (40D) are radial.

22. A method for bringing a gas into contact with a liquid by means of the device according to claim 15, in which a stream of said gas and a stream of said liquid are introduced into the enclosure upstream from the at least one mixing element.

23. A device for bringing a gas and a liquid into contact comprising an enclosure, first means for introducing into said enclosure and circulating therein a gas stream, second means for introducing into said enclosure and circulating therein a liquid stream that circulates inside the enclosure in the same direction as the gas stream, and means for mixing the gas stream and the liquid stream, which are positioned inside the enclosure in the path of the gas stream and liquid stream and which are capable of locally deflecting upward, of locally causing to rise, or a combination thereof, at least one portion of the gas stream and liquid stream, so as to locally create turbulences in the gas stream and in the liquid stream, and wherein the enclosure comprises, downstream from the means for mixing the gas stream and the liquid stream, a horizontal portion inside which is fixed at least one lower vertical internal wall which comprises a free upper edge spaced apart from a wall of this horizontal portion of the enclosure, so as to provide, between the wall of the horizontal portion of the enclosure and said free upper edge, a passage for the gas and the liquid.

24. The device according to claim 23, comprising, inside the horizontal portion of the enclosure, at least one upper internal wall, which comprises a free lower edge spaced apart from the wall of the horizontal portion of the enclosure, so as to provide a passage between the wall of the horizontal portion of the enclosure and said free lower edge and to force the gas to mix with the liquid as it passes through the horizontal portion of the enclosure.

25. The device according to claim 23 wherein the free lower edge of the at least one upper internal wall is positioned substantially at the same level as or at a lower level than the free upper edge of the lower vertical internal wall.

26. A method for bringing a gas into contact with a liquid by means of the device according to claim 23, in which a stream of said gas and a stream of said liquid are introduced into the enclosure upstream from the at least one mixing element.

* * * * *